(12) United States Patent
Claypole et al.

(10) Patent No.: US 6,318,077 B1
(45) Date of Patent: Nov. 20, 2001

(54) INTEGRATED THERMAL AND EXHAUST MANAGEMENT UNIT

(75) Inventors: George M. Claypole, Fenton; Gregory Alan Major, Beverly Hills; Arindam Dasgupta, Detroit, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/523,979

(22) Filed: Mar. 13, 2000

(51) Int. Cl.$^7$ .................................................. F01N 3/10
(52) U.S. Cl. .............................. 60/303; 60/300; 60/307; 60/320
(58) Field of Search ........................... 60/282, 300, 303, 60/307, 320; 422/171, 173, 179

(56) References Cited

U.S. PATENT DOCUMENTS

| | | | |
|---|---|---|---|
| 4,777,796 | * 10/1988 | McEachern, Jr. ...................... | 60/320 |
| 4,781,242 | * 11/1988 | Meijer et al. ........................... | 60/320 |
| 5,033,264 | * 7/1991 | Cabral .................................... | 60/320 |
| 5,353,590 | * 10/1994 | Pettit et al. ............................. | 60/303 |
| 5,353,591 | * 10/1994 | Kabasin et al. ........................ | 60/286 |
| 5,477,676 | * 12/1995 | Benson et al. ......................... | 60/303 |
| 5,570,576 | * 11/1996 | Ament et al. .......................... | 60/300 |
| 5,571,484 | * 11/1996 | Pettit et al. ............................. | 60/303 |
| 5,894,728 | * 4/1999 | Wakamoto .............................. | 60/303 |
| 5,901,780 | 5/1999 | Zeigler et al. .......................... | 165/42 |
| 5,934,073 | * 8/1999 | Gieshoff et al. ....................... | 60/320 |
| 6,162,403 | * 12/2000 | Foster et al. .......................... | 422/173 |
| 6,203,764 | * 3/2001 | Benson ................................... | 422/179 |

\* cited by examiner

Primary Examiner—Thomas Denion
Assistant Examiner—Diem Tran
(74) Attorney, Agent, or Firm—Laura C. Hargitt

(57) ABSTRACT

An integrated thermal and exhaust management unit for a vehicle comprises a housing defining a chamber and having an inlet through which engine exhaust gas flows. A fuel-fired heater is adjacent to the housing and is operable to heat the engine exhaust gas flowing through the chamber. A catalytic converter is adjacent to and in downstream flow communication with the chamber for catalyzing the engine exhaust gas flowing therethrough. An exhaust gas heat recovery unit is radially adjacent to and in downstream flow communication with the catalytic converter for exchanging exhaust gas heat to liquid heat for transferring to heat-requiring areas of the vehicle. A controller controls the operation of the management unit whereby the fuel-fired heater is powered if the catalyst temperature is less than a catalyst light-off temperature for efficient treatment of vehicle emissions. The exhaust gas heat recovery unit is only powered if the catalyst temperature is at or above the light-off temperature and there are heat-requiring areas in the vehicle.

2 Claims, 3 Drawing Sheets

INTEGRATED THERMAL AND EXHAUST MANAGEMENT UNIT

TECHNICAL FIELD

The present invention relates to an integrated thermal and exhaust management unit for a vehicle.

BACKGROUND OF THE INVENTION

High fuel efficiency and low engine emissions are key priorities when designing a vehicle powerplant. Enablers include rapidly warming the engine to the efficient operating temperature range and the catalytic converter to the light-off temperature so that undesirable exhaust gases are catalyzed rather than allowed to escape the vehicle as emissions. Current exhaust gas waste heat recovery systems are capable of capturing engine waste heat and re-circulating it to the engine or transferring it to a downstream catalytic converter.

As hybrid vehicles and highly efficient internal combustion engines become more prevalent in the market, there is a need for a new heating source to supplement residual engine heat utilized in the vehicle. For example, excess engine heat is used today to warm up the passenger compartment through a heater core. In a highly efficient internal combustion engine, there may be an inadequate supply of residual heat generated by the engine. Likewise when a hybrid vehicle is operating in a low power demand range, such as idle or city driving, the internal combustion engine may be turned off and therefore does not produce residual heat for meeting the thermal demands of the vehicle. To satisfy thermal demands, the hybrid vehicle may continue to run the internal combustion engine to produce heat when ideally the engine should be off. Hybrid vehicles may also employ a supplemental heat pump system for cabin heating when the engine is off, which drains electricity directly from the battery pack. Both options are expensive expenditures of energy.

Since hybrid vehicles typically employ smaller engines, which produce less heat and are usually not allowed to idle, engine warm-up time may be longer compared to conventional vehicles. A supplemental heating system may be used to accelerate engine warm-up thus contributing to improved efficiency and emissions. Hybrid vehicles also rely on high voltage batteries to supply a portion of the propulsion energy and these batteries require rapid warm-up for efficient operation.

Therefore the need exists for a single, integrated unit for both hybrid vehicles and engine-only powered vehicles, which provides supplemental heat for powerplant efficiency, emissions, and customer satisfaction.

SUMMARY OF THE INVENTION

The present invention is for an integrated thermal and exhaust management unit including a fuel-fired heater system, a catalytic converter, and an exhaust gas waste heat recovery unit, and a method for centrally controlling the unit to efficiently meet overall vehicle demands for thermal energy.

The integrated thermal and exhaust management unit includes a housing defining a chamber and having an inlet through which engine exhaust gas flows. A fuel-fired heater is adjacent to the housing and supplements the heat in the engine exhaust gas flowing through the chamber when required. The heated exhaust gas stream flows through a catalytic converter, which is in downstream flow communication with the chamber, for catalyzing the engine exhaust gas and fuel-fired heater emissions flowing therethrough. The integrated thermal and exhaust management unit further includes an exhaust gas heat recovery unit radially adjacent to and in downstream flow communication with the catalytic converter for exchanging exhaust gas heat to liquid heat for transferring to heat-requiring areas of the vehicle.

The integrated thermal and exhaust management unit provides thermal energy to improve engine warm-up by heating engine oil for enhanced lubrication under cold start conditions to improve engine durability. It operates to reduce emissions under cold start conditions by accelerating light-off of the catalyst as a result of rapid heating by the fuel-fired heater and insulating of the catalytic converter by the exhaust gas heat recovery unit. The unit may also improve passenger cabin warm-up for increased customer comfort.

Additionally for hybrid vehicles, the unit allows for passenger compartment heat during the engine-off mode without resorting to more significant expenditures of energy. Heat is also provided to quickly warm up the hybrid traction battery to its efficient operating temperature.

When required, the fuel-fired heater burns fuel to add additional thermal energy to the engine exhaust gas stream to warm the catalytic converter or may be exchanged to liquid medium on demand and delivered to areas of the vehicle requiring additional heat. Further, the exhaust gas heat recovery system encapsulates the catalytic converter with a vacuum for insulating the catalytic converter.

The integrated thermal and exhaust management unit provides an efficient mass and packaging unit by eliminating the need for hoses, ducts, and brackets linking remotely located and packaged individual thermal sources.

DESCRIPTION OF THE PREFERRED EMBODIMENT

An internal combustion engine 14, whether the sole source or joint source of vehicle power, produces exhaust gas which is expelled through exhaust line 16. The exhaust gas is a material input to an integrated thermal and exhaust management unit, shown generally as 10. Supplemental heat generated or captured by the management unit 10 may be transferred to vehicle areas requiring additional heat. These key areas are referred to collectively as "heat-requiring areas" 24. Such heat-requiring areas 24 may include: engine coolant circulated through the engine 14 to warm it during a cold start; engine oil to increase lubrication during an engine cold start; heater core for the occupant cabin; and hybrid vehicle traction battery pack, to name a few key areas. The supplemental thermal energy generated or captured improves vehicle efficiency, emissions, and occupant comfort.

Figure 1:
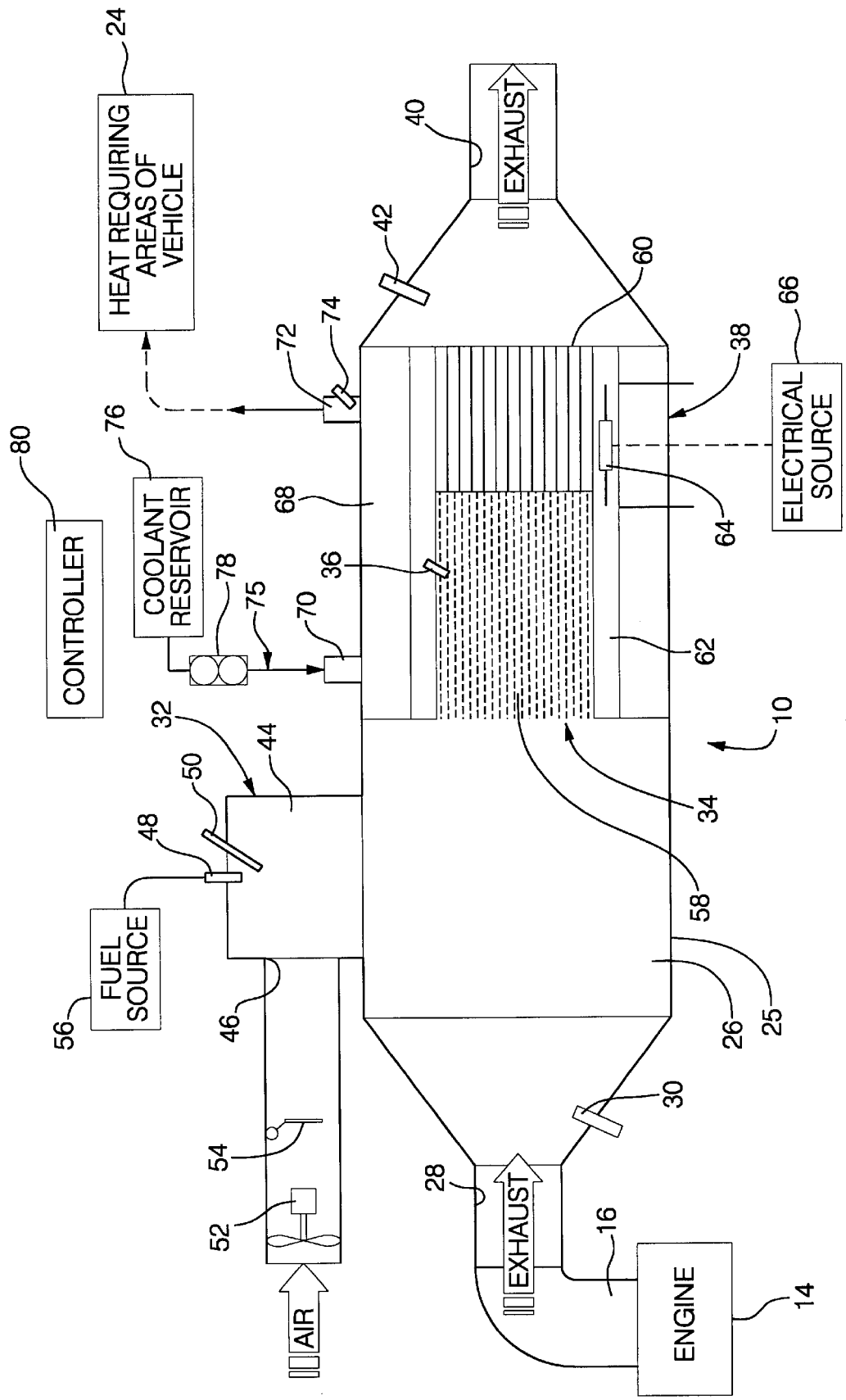
FIG. 1 is a schematic diagram of an integrated thermal and exhaust management unit of the present invention.

The following is a general description of the four main elements of the integrated thermal and exhaust management unit 10 as diagrammed schematically in FIG. 1. First, the management unit 10 includes a housing 25 defining a chamber 26 and having an inlet 28 through which engine exhaust gas flows from the engine exhaust line 16. An inlet temperature sensor 30 is mounted adjacent to the inlet 28 to sense the engine exhaust gas temperature as it enters the management unit 10. Second, a fuel-fired heater 32 is adjacent to the housing 25 for supplying additional heat to the exhaust stream flowing through the chamber 26. Third, the management unit 10 includes a catalytic converter 34 adjacent to and in downstream flow communication with the chamber 26, for catalyzing engine exhaust gas. The catalytic converter 34 includes a catalyst temperature sensor 36. Fourth, an annular exhaust gas heat recovery unit 38 is radially adjacent to and in downstream flow communication with the catalytic converter 34 and has a downstream exhaust outlet 40 where gas exits the management unit 10 and an exhaust gas temperature sensor 42 adjacent the exhaust outlet.

More particularly, the fuel-fired heater 32, adjacent to the housing 25, generates additional heat directly in to the exhaust stream flowing through the chamber 26. The fuel-fired heater 32 includes a combuster 44 having an air inlet 46, a fuel injector 48, and an igniter 50, to initiate combustion. An air blower 52 blows air into the air inlet 46. A check valve 54 between the blower 52 and air inlet 46 prevents back flow of exhaust gas into the fresh air supply. An oxygen sensor, not shown, may bias air flow rate by adjusting blower speed. A fuel pump, not shown, pumps fuel from a fuel source 56 to the fuel injector 48. A flame present sensor, not shown, may be housed in the combuster 44 to confirm that fuel injected into combuster is fully burned. When the fuel-fired heater 32 is operating, it may produce a flame directly into the chamber 26 thereby heating the exhaust stream as it enters the catalytic converter 34.

The catalytic converter 34 is comprised of a corrugated matrix 58 having a catalyst applied thereto. The catalyst functions to catalyze or oxidize the exhaust gas flowing therethrough, but only at temperatures above the light-off temperature, which is dependent on the particular catalyst.

The exhaust gas heat recovery unit 38 is comprised of a heat exchanger core 60 adjacent to and in downstream flow communication with the catalytic converter 34. It also includes an annular vacuum canister 62, which closely encircles both the catalytic converter 34 and the heat exchanger core 60. A hydride pellet 64 is disposed within the canister 62 and is wired to an electrical source 66, which operates to electrically heat the pellet causing it to release hydrogen gas into the canister. Concentric with and encircling the canister 62 is an annular water jacket 68 having a coolant inlet 70 and a coolant outlet 72 for circulating liquid through the water jacket. The high heat transfer capabilities of hydrogen gas facilitate the transfer of exhaust gas thermal energy to the liquid in the water jacket 68. At the coolant outlet 72, a coolant temperature sensor 74 is present to monitor the temperature of liquid to be circulated to heat-requiring areas 24 of the vehicle.

The liquid flowing through the water jacket 68 of the exhaust gas heat recovery unit 38 may be a higher temperature coolant than is conventionally used in motor vehicles. In such a case, the management unit 10 requires a dedicated coolant flow circuit 75 with a coolant reservoir 76 and a coolant pump 78, to cycle the higher temperature coolant through the exhaust gas heat recovery unit 38 and to heat-requiring areas 24 in the vehicle. Alternatively, if a common coolant is used for both the engine and the management unit, then a dedicated flow path and reservoir may not be needed, although the separate coolant pump 78 may still be needed.

A central controller 80 controls the thermal and exhaust management unit 10. It may receive input measurements from inlet and outlet exhaust gas temperature sensors 30 and 42, catalytic converter catalyst temperature sensor 36, coolant outlet temperature sensor 74, and an engine run status, not shown. The controller 80 may also receive signals from the cabin heating control and other temperature sensors for areas in the vehicle routed to receive heat from the management unit 10. The controller 80 controls the operation of the fuel-fired heater 32 including the fuel pump run command, the blower speed control, the fuel injector duty cycle, check valve position, and igniter control. The controller 80 also controls the exhaust gas heat recovery unit 38 including when the electrical source 66 delivers power to the hydride pellet 64 and when the coolant pump 78 pumps liquid through the water jacket 68.

Figure 2:
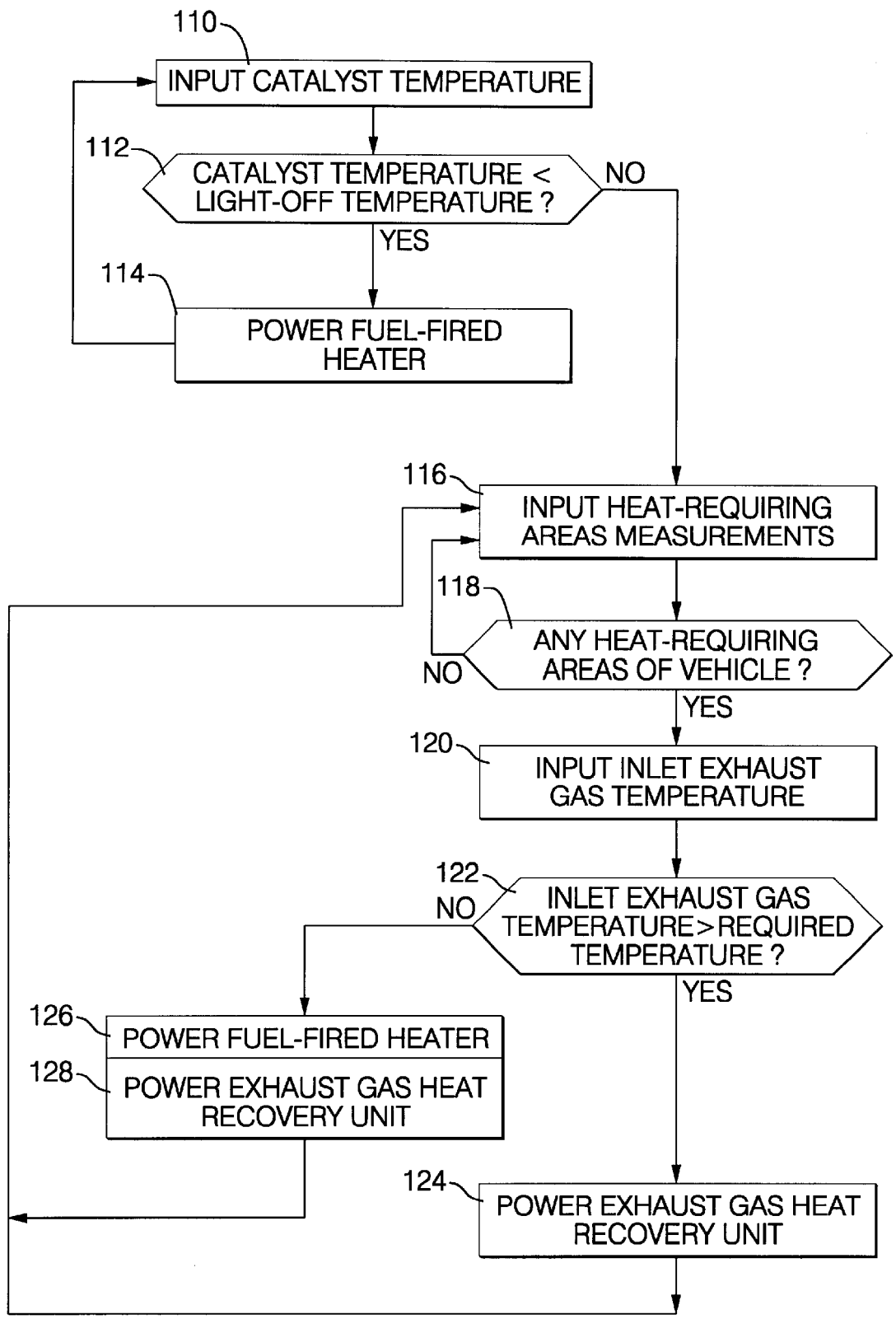
FIG. 2 is a flow diagram of a method of controlling the unit of FIG. 1 as employed in a vehicle with an internal combustion engine as the soul source of power.

The system operation and method of controlling the integrated thermal and exhaust management unit 10 will now be described with respect to an internal combustion engine 14 as the sole source of propulsion power with additional reference to FIG. 2.

When the engine 14 is initially started after an extended cold soak in a cold environment, the objective is to accelerate catalyst light-off and provide heat to heat-requiring areas 24 of the vehicle. The controller 80 first receives input from the catalyst temperature sensor 36 of the catalytic converter 34 in block 110 and compares the catalyst temperature to the light-off temperature in block 112. If the controller 80 receives data that the catalyst 58 is below the light-off temperature, then the controller initiates operation of the fuel-fired heater 32 in block 114. The fuel-fired heater 32 is activated by commanding the fuel pump to run, commanding the fuel injector 48, initiating and setting the blower speed, and sparking the igniter 50 to spark combustion in the combuster 44. The hot combustion gas produced flows directly into the adjacent catalytic converter 34, thereby raising the catalyst temperature to accelerate catalyst light-off. The combuster exhaust gas then flows through the heat exchanger core 60 and out the exhaust outlet 40, along with engine exhaust gas which has been oxidized in the catalytic converter 34.

If the catalyst 58 has reached the light-off temperature, the controller 80 then receives input from various points in the vehicle, which are capable of receiving heat from the management unit 10, in block 116 and monitors whether any of these areas require heat in block 118. For example, the controller 80 may monitor if the occupant has selected more cabin heat, if the engine oil and coolant temperatures are below desired operating temperatures, or if the traction battery temperature is below operating temperature. If there are such heat-requiring areas 24, the controller 80 receives input from the inlet exhaust gas temperature sensor 30 in block 120 and checks if the engine exhaust gas is sufficiently warm to satisfy the heat-requiring areas' needs in block 122.

If the temperature of the inlet engine exhaust gas is sufficiently warm, the controller 80 powers the exhaust gas heat recovery unit 38 to capture the heat in the exhaust stream in block 124. This entails turning on the coolant pump 78 to circulate liquid through the water jacket 68 of the heat exchanger core 60 and the electrical source 66 to electrically heat the hydride pellet 64, which releases hydrogen gas into the canister 62. Heat is efficiently transferred from the hydrogen gas to the liquid in the water jacket 68, where the heated liquid may then be used to warm heat-requiring areas 24 of the vehicle. For example, the heated liquid may be routed through the heater core where air is blown over it and the heated air is blown into the passenger cabin. The heated liquid may be routed back to the engine for warming the engine 14 to its optimum operating temperature. The heated liquid may be pumped through a hybrid vehicle's traction battery to raise the battery temperature to its optimum operating temperature.

If the inlet exhaust gas temperature is below the required temperature to satisfy the needs of the heat-requiring areas 24, then the controller 80 powers the fuel-fired heater 32 to add heat to the exhaust stream in block 126. The controller 80 then powers the exhaust gas heat recovery unit 38 in block 128, as described above, to capture the heat generated by the fuel-fired heater 32 and distribute it to the heat-requiring areas 24.

Note that even if there are heat-requiring areas 24 of the vehicle, but the catalyst 58 has not yet reached the light-off temperature, operation of the exhaust gas recovery unit 38 is delayed so that heat is not drawn out of the exhaust stream warming the catalyst.

Figure 3:
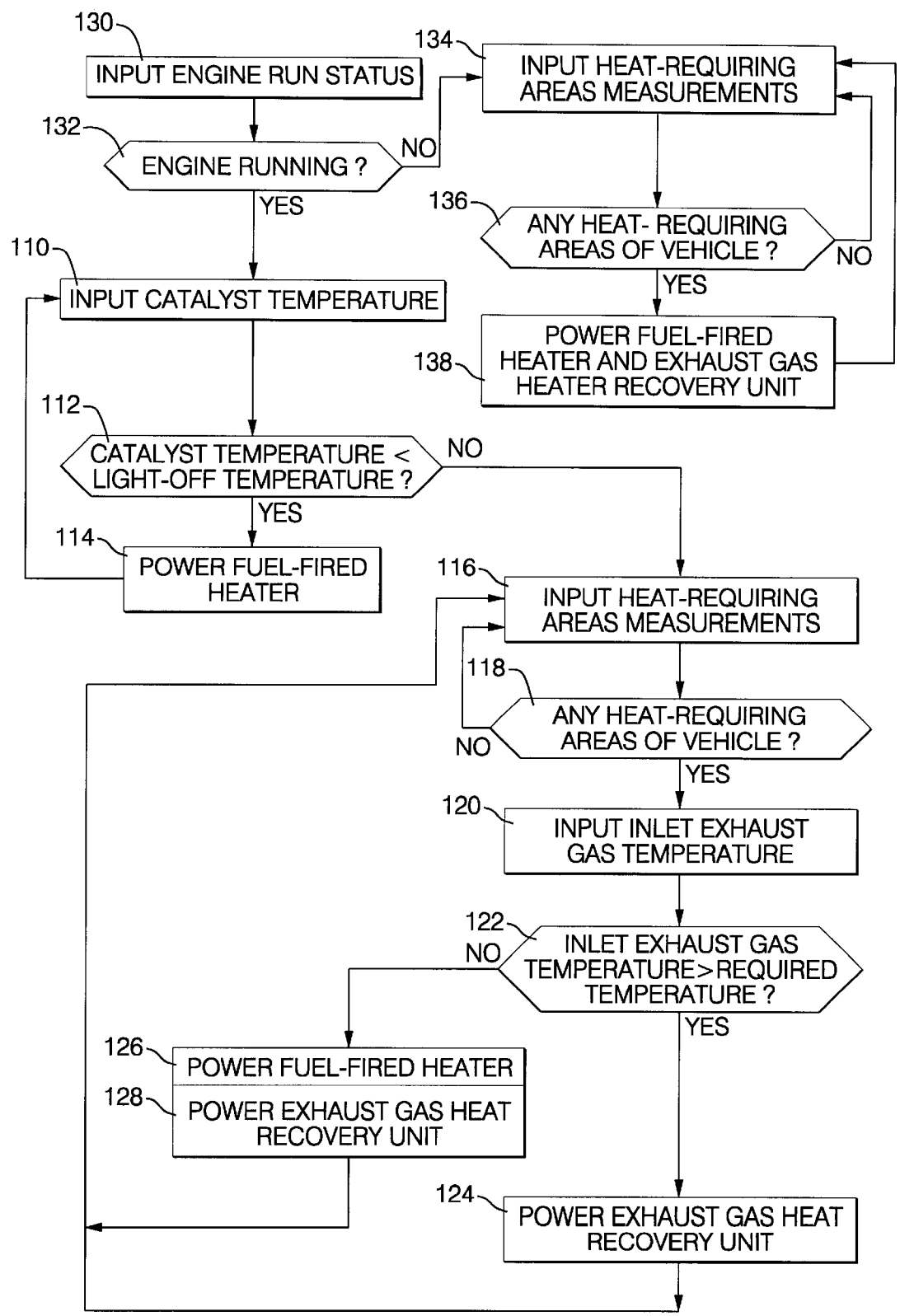
FIG. 3 is a flow diagram of a method of controlling the unit of FIG. 1 as employed in a vehicle with an internal combustion engine as a joint source of power, as in a hybrid vehicle.

The system operation and method of controlling the integrated thermal and exhaust management unit 10 will now be described with respect to an internal combustion engine 14 as a joint source of power as in a hybrid vehicle, with additional reference to FIG. 3. In this case, the controller 80 first receives input of the engine run status in block 130 and determines if the engine 14 is operating in block 132. If the engine 14 is operating, the method of controlling the thermal and exhaust management unit 10 mimics the above described method where the engine is the sole source of power and like steps are numbered the same (i.e. blocks 110–128).

If the engine 10 is off, then there is no need to check the catalyst temperature and those steps are bypassed. The controller 80 then receives input from various points in the vehicle in block 134 and checks whether there are heat-requiring areas 24 in block 136. If so, the controller 80 powers the fuel-fired heater 32 and the exhaust gas heat recovery unit 38 in block 138 to generate and transfer heat to that area of the vehicle.

By integrating the thermal and exhaust functions into one unit, vehicle emissions may be reduced. When the catalyst of a catalytic converter is below a certain temperature, the catalyst will not light-off, which increases tailpipe emissions. With this management unit 10, if the catalyst 58 is below the light-off temperature, the fuel-fired heater 32 is quickly activated and combuster heat is transferred to the adjacent catalytic converter 34. This promotes oxidation in the catalytic converter 34 to properly function to reduce vehicle emissions. In addition, the emissions from the fuel-fired heater 32 can be catalyzed simultaneously with the engine exhaust in the catalytic converter 34.

Further, the exhaust gas heat recovery unit 38 insulates the catalytic converter 34 to maintain a higher temperature for rapid light-off. The insulation occurs when electrical power is discontinued to the hydride pellet 64, permitting the re-absorption of hydrogen by the pellet and causing a vacuum, to thereby insulate the catalyst matrix 58.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A thermal and exhaust management method, comprising the steps of:

monitoring a catalyst temperature of a catalytic converter;

comparing the catalyst temperature to a light-off temperature;

if the catalyst temperature is below the light-off temperature, powering a fuel-fired heater to heat the catalytic converter;

if the catalyst temperature is greater than or equal to the light-off temperature, monitoring for heat-requiring areas of a vehicle;

if heat-requiring areas of the vehicle are present, monitoring inlet exhaust gas temperature;

comparing inlet exhaust gas temperature to a temperature needed for heat-requiring areas of the vehicle;

if inlet exhaust gas temperature is less than temperature needed for heat-requiring areas of the vehicle, powering fuel-fired heater and exhaust gas heat recovery unit; and if inlet exhaust gas temperature is greater than or equal to temperature needed for heat-requiring areas of the vehicle, powering exhaust gas heat recovery unit.

2. A thermal and exhaust management method, as defined in claim 1, wherein the step of powering exhaust gas heat recovery unit further comprises the steps of:

circulating liquid through a water jacket about the catalytic converter; and releasing hydrogen gas into a canister intermediate the catalytic converter and the water jacket.

* * * * *